United States Patent
Tailor et al.

(10) Patent No.: US 10,542,451 B1
(45) Date of Patent: Jan. 21, 2020

(54) SYSTEMS AND METHODS FOR MANAGING CONFLICTS BETWEEN ACCESS NODE PROTOCOLS

(71) Applicant: Sprint Spectrum LP, Overland Park, KS (US)

(72) Inventors: Pinal Tailor, Ashburn, VA (US); Tri Duong, Annandale, VA (US); Harsh Mehta, Herndon, VA (US); Aaron Pawlowski, Potomac Falls, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 560 days.

(21) Appl. No.: 14/302,906

(22) Filed: Jun. 12, 2014

(51) Int. Cl.
*H04L 12/927* (2013.01)
*H04W 28/02* (2009.01)

(52) U.S. Cl.
CPC .............................. *H04W 28/0268* (2013.01)

(58) Field of Classification Search
None
See application file for complete search history.

(56) References Cited

U.S. PATENT DOCUMENTS

| | | | |
|---|---|---|---|
| 7,804,952 B2 * | 9/2010 | Chandra | H04L 65/80 370/238 |
| 8,107,950 B2 | 1/2012 | Amirijoo et al. | |
| 8,693,345 B2 * | 4/2014 | Lee | H04L 41/14 370/241 |
| 9,237,502 B1 * | 1/2016 | Pawar | H04W 36/22 |
| 9,635,566 B2 * | 4/2017 | Cui | H04W 24/02 |
| 9,693,295 B2 * | 6/2017 | Zhang | H04W 48/20 |
| 2013/0003548 A1 * | 1/2013 | Sridhar | H04L 47/125 370/235 |
| 2014/0329528 A1 * | 11/2014 | Zhao | H04W 36/30 455/436 |

* cited by examiner

*Primary Examiner* — Willie J Daniel, Jr.

(57) ABSTRACT

Systems and methods are described for managing conflicts between a load balancing protocol and a neighbor relations protocol. Network characteristics for an access node in communication with a plurality of wireless devices may be determined. The plurality of wireless devices may be classified into a high priority class and a low priority class based on a traffic requirement for each of the wireless devices. The determined network conditions my then be compared to a criteria. Based on the comparison, the high priority class of wireless devices may be instructed to perform one of a neighbor relations protocol and a load balancing protocol.

13 Claims, 7 Drawing Sheets

SYSTEMS AND METHODS FOR MANAGING CONFLICTS BETWEEN ACCESS NODE PROTOCOLS

TECHNICAL BACKGROUND

Telecommunication systems, such as cellular networks or other wireless networks, use various network links throughout the network to communicate. For example, an access node may use a network link to communicate with another access node while using a separate network link to communicate with a controller node. Accordingly, the system may rely on a well-established network to provide efficient communication services.

In certain circumstances, an access node may be unknown to proximate access nodes within the same communication system. For example, a newly established access node may not be known to its neighboring access nodes. A system designed to efficiently update access nodes about their neighboring access node would allow for an enhanced quality of service for the users of the system.

OVERVIEW

Systems and methods are described for managing conflicts between a load balancing protocol and a neighbor relations protocol. Network characteristics for an access node in communication with a plurality of wireless devices may be determined. The plurality of wireless devices may be classified into a high priority class and a low priority class based on a traffic requirement for each of the wireless devices. The determined network conditions my then be compared to a criteria. Based on the comparison, the high priority class of wireless devices may be instructed to perform one of a neighbor relations protocol and a load balancing protocol.

DETAILED DESCRIPTION

Figure 1:
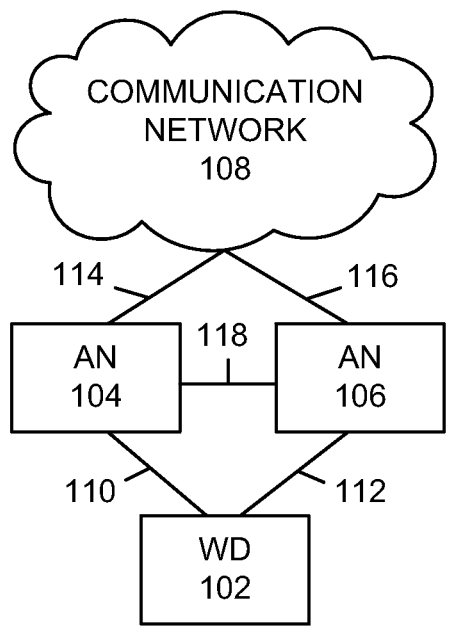
FIG. 1 illustrates an exemplary communication system to manage conflicts between a load balancing protocol and a neighbor relations protocol.

FIG. 1 illustrates an exemplary communication system 100 to manage conflicts between a load balancing protocol and a neighbor relations protocol comprising wireless device 102, access nodes 104 and 106, communication network 108, and communication links 110, 112, 114, 116, and 118. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104, access node 106, and communication network 108 which are omitted for clarity, including additional processing nodes, routers, gateways, and physical and/or wireless data links for carrying data among the various network elements.

Wireless device 102 can be any device configured to communicate over communication system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with each of access nodes 104 and 106, any number of wireless devices can be implemented.

Access nodes 104 and 106 are network nodes capable of providing wireless communications to wireless device 102, and can be, for example, a base transceiver station, a radio base station, an eNodeB device, or an enhanced eNodeB device. Access nodes 104 and 106 may communicate with communication network 108 over communication links 114 and 116. Access nodes 104 and 106 may also communicate directly with each other over communication link 118. In an embodiment, access node 104 can comprise a serving access node for wireless device 102.

Although only two access nodes 104 and 106 are illustrated in FIG. 1, wireless device 102 can be in communication with a plurality of access node. The plurality of access nodes can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, 114, 116, and 118 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, WIMAX, EV-DO, WiMAX, or 3GPP LTE, or combinations thereof. Other wireless protocols can also be used.

Figure 2:
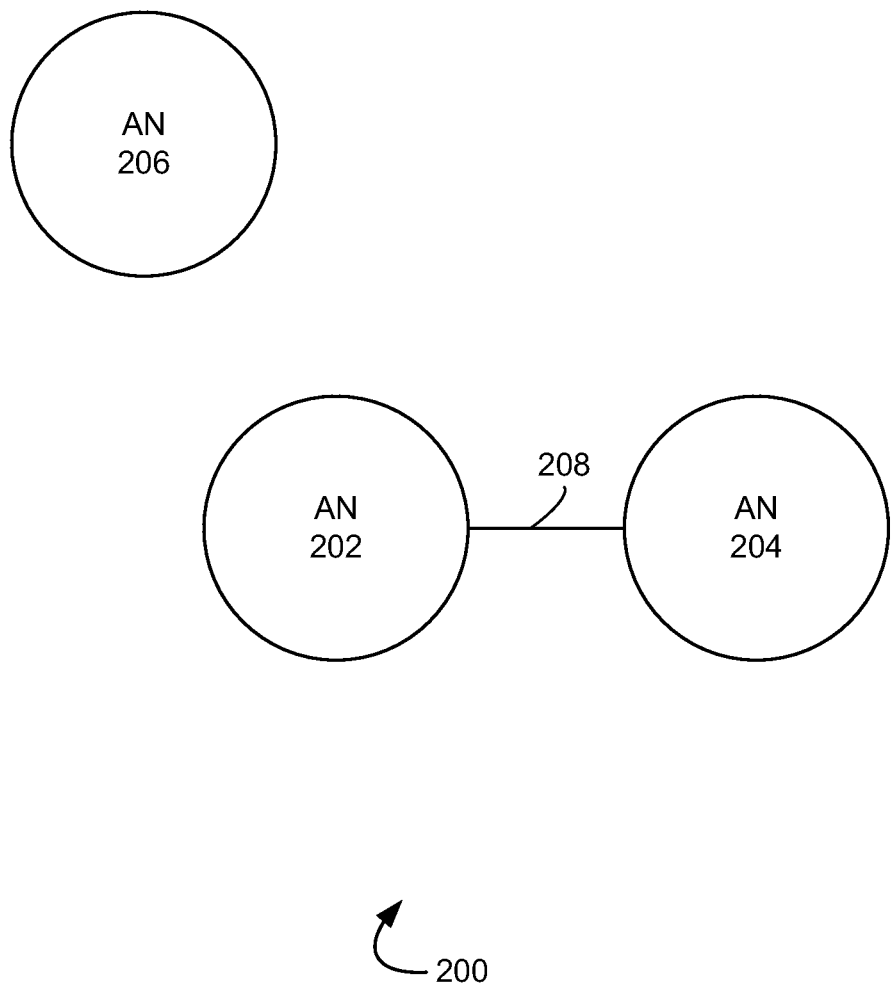
FIG. 2 illustrates another exemplary system to manage conflicts between a load balancing protocol and a neighbor relations protocol.

FIG. 2 illustrates an exemplary communication system 200 for managing conflicts between a load balancing protocol and a neighbor relations protocol. System 200 comprises access nodes 202, 204 and 206, and communication link 208. Access nodes 202, 204 and 206 may comprise access nodes similar to access node 104 of FIG. 1. Communication link 208 may comprise a communication link similar to communication link 118 of FIG. 1.

In operation, access node 202 may establish communication with a plurality of wireless devices such that access node 204 provides the wireless devices access to a communication network (such as communication network 108, illustrated in FIG. 1). The wireless devices may comprise one or more traffic conditions. For example, the wireless devices may each comprise an application requirement, a mobility, an activity factor, and any other suitable traffic condition.

In an embodiment, communication system 200 may be configured to manage access node neighbor relations. For example, communication system 200 may implement a self-organizing network (SON) protocol that includes an automatic neighbor relations (ANR) protocol, or may implement any other suitable protocol for managing access node neighbor relations.

In an embodiment, access node 202 may not be aware of access node 206. For example, access node 202 may track neighbor access nodes using a neighbor relations table (NRT) that stores information about access node 202's neighbors. The NRT may store identifiers for neighbor access nodes (e.g., PCI, CGI, and the like), connection information (e.g., X2 connection information), handover information, and any other suitable neighbor information. In this example, access node 202 may not comprise an entry in the neighbor relations table for access node 206.

In an embodiment, access node 206 may comprise a new access node. In other words, access node 206 may have been connected to communication network 200 recently (e.g., within a threshold time period). In this example, access node 202 may not be aware of access node 206 because it is a new access node. Access node 202 may be configured to discover access node 206 using, for example, an ANR process.

In an embodiment, access node 202 may use wireless devices in communication with the access node in order to discover new neighbor access nodes. Here, access node 202 may transmit a criteria, such as an ANR criteria, to wireless devices in communication with access node 202. The ANR criteria may comprise a signal level criteria. An ANR event may be triggered at one of the wireless devices in communication with access node 202 based on a comparison of the received ANR signal level criteria, a signal level for a reference signal or pilot signal received from access node 202, and a signal level for a reference signal or pilot signal received from access node 206. In response to the triggered ANR event, the wireless device may transmit a measurement report comprising a signal level for each reference signal or pilot signal received at the wireless device (e.g., from a plurality of access nodes), and an identifier (e.g., PCI, CGI, and the like) for each access node. In an embodiment, the measurement report may comprise signal levels that are above a criteria (e.g., a determined threshold).

Access node 202 may receive the measurement report and compare the access node identifiers in the NRT against those in the received measurement report. Here, because access node 202 is not aware of access node 206, the NRT for access node 202 does not include information about access node 206. Accordingly, access node 202 may commence a process to add access node 206 as a neighbor (e.g., update the NRT to include information for access node 206). In an embodiment, access node 202 may instruct the wireless device to retrieve a global identifier for access node 206 and transmit the global identifier to access node 202. Using the global identifier, access node 202 may obtain an IP address for access node 206 (e.g., from a controller node such as an MME). A communication link may then be established between access node 202 and access node 206 (e.g., an X2 connection). Based on this process, access node 202 may update the NRT to include information about access node 206.

In an embodiment, communication system 200 may also be configured to perform traffic management. For example, communication system 200 may implement a load balancing protocol that leverages offloading wireless devices to neighboring access nodes in order to balance load on the communication system.

In an embodiment, access node 202 may be in communication with a plurality of wireless devices. Here, access node 202 may be under operating conditions such that a load balancing protocol is triggered. For example, a utilization for access node 202 (e.g. physical resource block utilization, processor utilization, data bearer channel utilization, and the like) may be compared to a criteria, and load balancing may be triggered based on the comparison. In another example, the load balancing protocol may be triggered based on a time period (e.g., periodic trigger), a threshold number of wireless devices in communication with access node 202, or any other suitable trigger.

In an embodiment, access node 202 and 204 may be neighboring access nodes such that the access nodes are communicatively coupled by communication link 208 (e.g., an X2 communication link). Accordingly, when performing a load balancing protocol, access nodes 202 and 204 may share load information (e.g., over communication link 208). The load information may comprise physical resource block utilization, processor utilization, data bearer channel utilization, and the like. Based on the shared load information, one or more wireless devices in communication with access node 202 may be handed over to access node 204. That is, the serving access node for one or more wireless devices may change from access node 202 to access node 204.

In an embodiment, one or both of the neighbor relations protocol and the load balancing protocol may be performed in communication system 200. For example, access node 204 may perform one or both of the protocols. Accordingly, a conflict resolution system may be leveraged in order to manage the two protocols.

Systems and methods are described for managing conflicts between a load balancing protocol and a neighbor relations protocol. Network characteristics for an access node in communication with a plurality of wireless devices may be determined. The plurality of wireless devices may be classified into a high priority class and a low priority class based on a traffic requirement for each of the wireless devices. The determined network conditions my then be compared to a criteria. Based on the comparison, the high priority class of wireless devices may be instructed to perform one of a neighbor relations protocol and a load balancing protocol.

Figure 3:
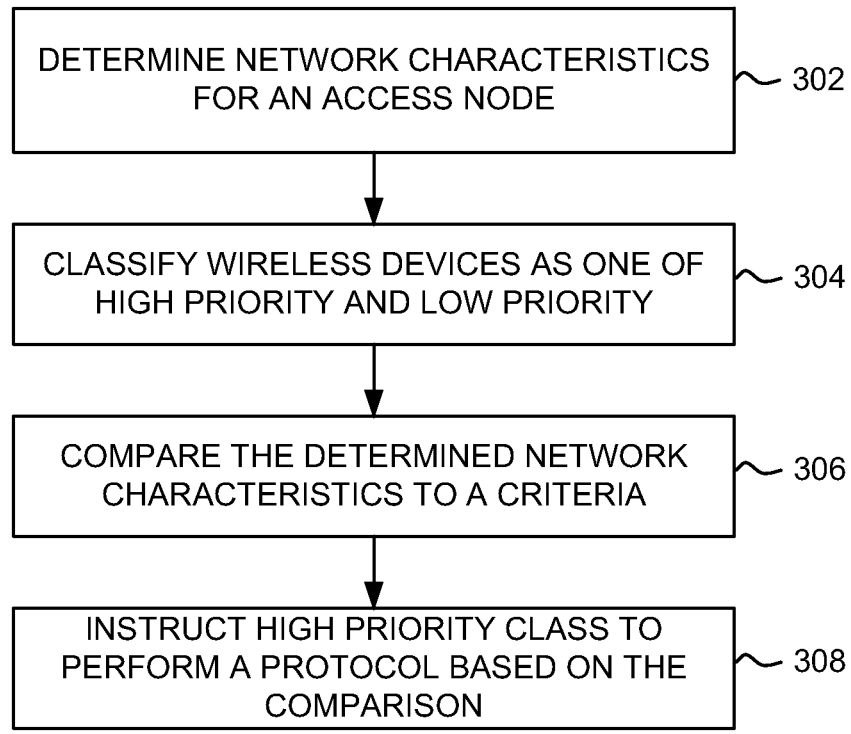
FIG. 3 illustrates an exemplary method of managing conflicts between a load balancing protocol and a neighbor relations protocol.

FIG. 3 illustrates an exemplary method for managing conflicts between a load balancing protocol and a neighbor relations protocol. The method will be discussed with reference to the exemplary communication system 200 illustrated in FIG. 2, however, the method can be implemented with any suitable communication system.

Referring to FIG. 3, at step 302, network characteristics for an access node may be determined. For example, network characteristics for access node 202 may be determined. The network characteristics may comprise a utilization indicator, a connectivity indicator, and a capacity indicator for access node 202. An example of a utilization indicator may be the physical resource block utilization of access node 202. An example of a connectivity indicator may be the number of Radio Resource Control (RRC) connections between access node 202 and wireless devices in communication with access node 202. An example of a capacity indicator may be the utilization of the Physical Downlink Shared Channel (PDSCH) of access node 202. In another example, a capacity indicator may also be the utilization of data bearer channels of access node 202.

At step 304, wireless devices in communication with the access node are classified. For example, wireless devices in communication with access node 202 may be classified as one of a high priority and a low priority. Each wireless device may comprise a traffic condition and the wireless devices may be classified based on the traffic condition. The traffic condition may comprise an application requirement, a mobility, an activity factor, and any other suitable traffic condition. An application requirement, or a quality of service (QoS) requirement, may be one or more service conditions that a wireless device requests from an access node, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement.

At step 306, the determined network characteristics are compared to a criteria. For example, the network characteristics determined for access node 202 may be compared to a criteria. In an embodiment, the network characteristics may comprise a utilization indicator, a connectivity indicator, and a capacity indicator, and these indicators may be compared to the criteria.

At step 308, the high priority class of wireless devices is instructed to perform one of a load balancing protocol and a neighbor relations protocol based on the comparison. For example, the high priority class of wireless devices in communication with access node 202 may be instructed to perform one of the load balancing protocol and the neighbor relations protocol based on the comparison from step 306. The load balancing protocol may be a protocol used to balance load within communication system 200, as described herein. The neighbor relations protocol may be the Automatic Neighbor Relations protocol (ANR) as described herein.

Figure 4:
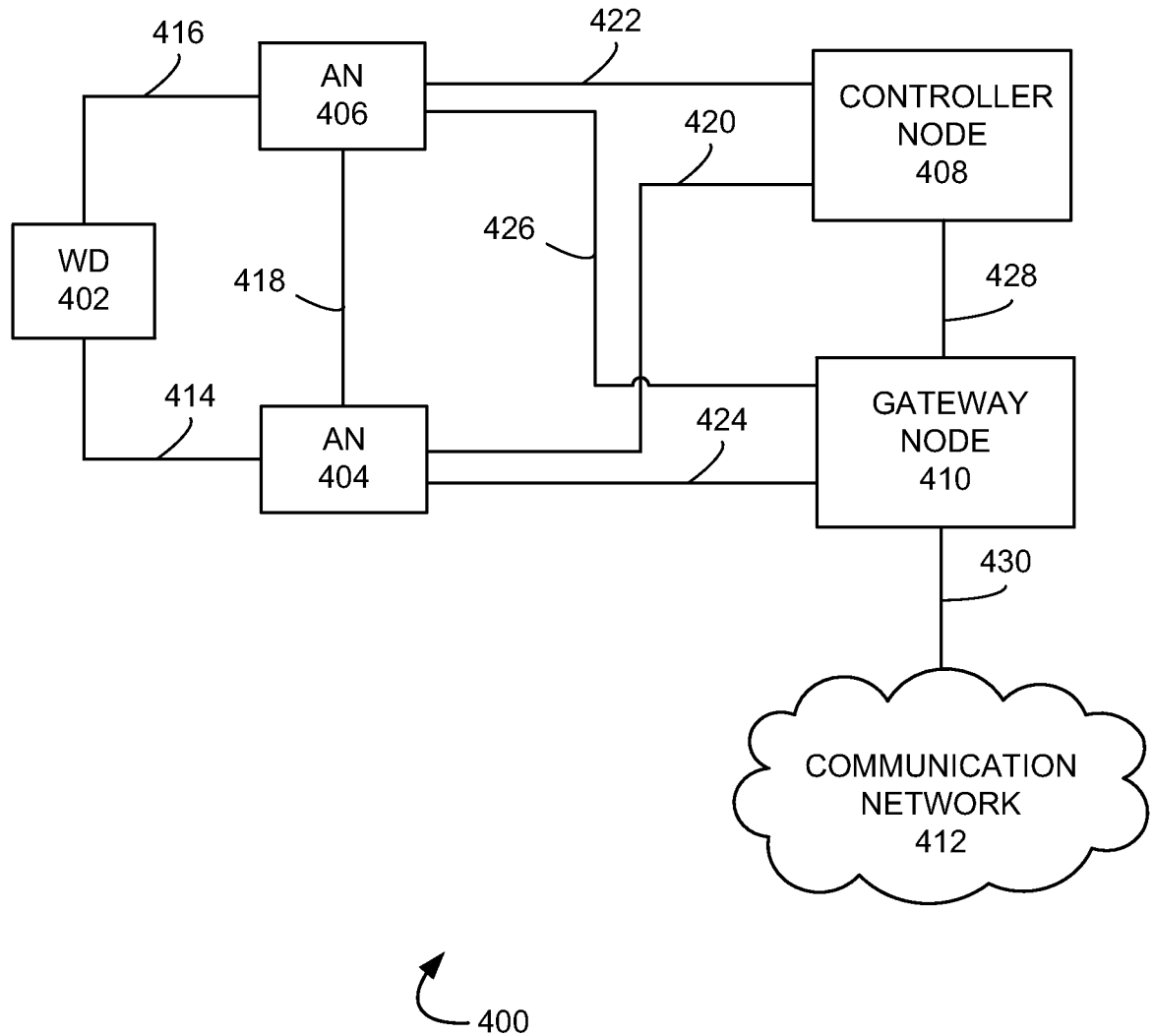
FIG. 4 illustrates another exemplary system to manage conflicts between a load balancing protocol and a neighbor relations protocol.

FIG. 4 illustrates another exemplary communication system 400 to manage conflicts between a load balancing protocol and a neighbor relations protocol. Communication system 400 may comprise a wireless device 402, access nodes 404 and 406, controller node 408, gateway node 410, communication network 412, and communication links 414, 416, 418, 420, 422, 424, 426, 428, and 430. Other network elements may be present in the communication system 400 to facilitate communication but are omitted for clarity, such as base stations, base station controllers, gateways, mobile switching centers, dispatch application processors, and location registers such as a home location register or visitor location register.

Wireless device 402 can be any device configured to communicate over communication system 400 using a wireless communication link. For example, wireless device 402 can include a cell phone, a smart phone, a computing platform such as a laptop, palmtop, or a tablet, a personal digital assistant, or an internet access device, and combinations thereof.

Access nodes 404 and 406 are network nodes capable of providing wireless communications to wireless device 402, and can be, for example, a base transceiver station, a radio base station, an eNodeB device, or an enhanced eNodeB device. In an embodiment, access node 404 can comprise a serving access node for wireless device 402. Access nodes 404 and 406 may communicate with controller node 408 over communication links 420 and 422, and with gateway node 410 over communication links 424 and 426. Access nodes 404 and 406 may also communicate directly with each other over communication link 418.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a radio network controller (RNC), a mobile switching center (MSC), and a combination thereof. In an embodiment, controller node 408 may perform all or parts of the methods of FIGS. 3 and 6.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access nodes 404 and 406 related to channel selection in communications with wireless device 402. For example, gateway node 410 can comprise at least one of a serving gateway (SGW), a packet data network gateway (PDNGW), a cellular gateway (CGW), and a combination thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, 424, 426, 428, and 430 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access nodes 404 and 406, controller node 408, gateway node 410, and communication network 412 which are omitted for clarity, including additional processing nodes, routers, gateways, and physical and/or wireless data links for carrying data among the various network elements. In an embodiment, any of controller node 408, gateway node 410, one or more modules of access nodes 404, and one or more modules of access node 406 may perform all or parts of the methods of FIGS. 3 and 6.

Figure 5:
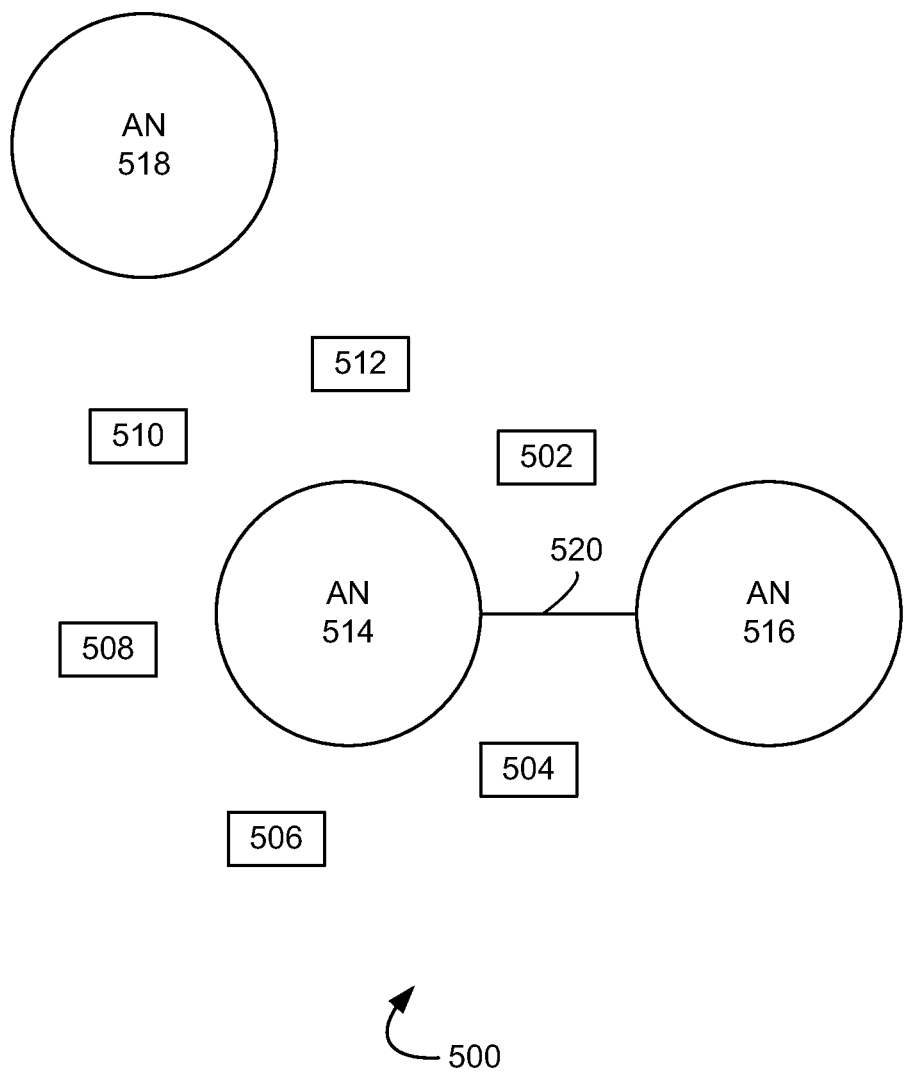
FIG. 5 illustrates an exemplary system to manage conflicts between a load balancing protocol and a neighbor relations protocol.

FIG. 5 illustrates an exemplary communication system 500 for managing conflicts between a load balancing protocol and a neighbor relations protocol. System 500 comprises wireless devices 502, 504, 506, 508, 510, and 512, access nodes 514 and 516, and 518, and communication link 520. Wireless devices 502, 504, 506, 508, 510, and 512 may be similar to wireless device 402 of FIG. 4. Similarly, access nodes 514, 516, and 518 may comprise access nodes similar to access node 404 of FIG. 4. Communication link 520 may be similar to communication link 418 of FIG. 4.

In operation, access node 514 may establish communication with wireless devices 502, 504, 506, 508, 510, and 512 such that access node 514 provides the wireless devices access to a communication network (such as communication network 412). In an embodiment, the wireless devices may comprise one or more traffic conditions. For example, the wireless devices may each comprise an application requirement, a mobility, an activity factor, and any other suitable traffic condition.

In an embodiment, communication system 500 may be configured to manage access node neighbor relations. For example, communication system 500 may implement a self-organizing network (SON) protocol that includes an automatic neighbor relations (ANR) protocol, or may implement any other suitable protocol for managing access node neighbor relations.

In an embodiment, access node 514 may not be aware of access node 518. For example, access node 514 may track neighbor access nodes using a neighbor relations table (NRT) that stores information about access node 514's neighbors (e.g., neighboring access nodes). The NRT may store identifiers for neighbor access nodes (e.g., PCI, CGI, and the like), connection information (e.g., X2 connection information), handover information, and any other suitable neighbor information. In this example, access node 514 may not comprise an entry in the neighbor relations table for access node 518.

In an embodiment, access node 518 may comprise a new access node. In other words, access node 518 may have been connected to communication network 500 recently (e.g., within a threshold time period). In this example, access node 514 may not be aware of access node 518 because it is a new access node. Access node 514 may be configured to discover access node 518 using, for example, an ANR process.

In an embodiment, access node 514 may use wireless devices in communication with access node 514 in order to discover new neighbor access nodes. For example, access node 514 may use one or more of wireless devices 502, 504, 506, 508, 510, and 512 to discover new neighbor access nodes. Here, access node 514 may transmit a criteria, such as an ANR criteria, to wireless devices 502, 504, 506, 508, 510, and 512. The ANR criteria may comprise a signal level criteria. In an example, an ANR event may be triggered at wireless device 512 based on a comparison of the received ANR criteria, a signal level for a reference signal or pilot signal received from access node 514, and a signal level for a reference signal or pilot signal received from access node 518. In response to the triggered ANR event, wireless device 512 may transmit a measurement report comprising a signal level for each reference signal or pilot signal received at the wireless device (e.g., from a plurality of access nodes), and an identifier (e.g., PCI, CGI, and the like) for each access node. In an embodiment, the measurement report may comprise signal levels that are above a criteria (e.g., a determined threshold).

Access node 514 may receive the measurement report and compare the access node identifiers in the NRT against those in the received measurement report. Here, because access node 514 is not aware of access node 518, the NRT for access node 514 does not include information about access node 518. Accordingly, access node 514 may commence a process to add access node 518 as a neighbor (e.g., update the NRT to include information for access node 518). In an embodiment, access node 514 may instruct wireless device 512 to retrieve a global identifier for access node 518 and transmit the global identifier to access node 514. Using the global identifier, access node 514 may obtain an IP address for access node 518 (e.g., from a controller node such as an MME). A communication link may then be established between access node 514 and access node 518 (e.g., an X2 connection). Based on this process, access node 514 may update the NRT to include information about access node 518.

In an embodiment, communication system 500 may also be configured to perform traffic management. For example, communication system 500 may implement a load balancing protocol that leverages offloading wireless devices to neighboring access nodes in order to balance load on the communication system.

In an embodiment, access node 514 may be in communication with wireless devices 502, 504, 506, 508, 510, and 512. Here, access node 514 may be under operating conditions such that a load balancing protocol is triggered. For example, a utilization for access node 514 (e.g. physical resource block utilization, processor utilization, data bearer channel utilization, and the like) may be compared to a criteria, and load balancing may be triggered based on the comparison. In another example, the load balancing protocol may be triggered based on a time period (e.g., periodic trigger), a threshold number of wireless devices in communication with access node 514, or any other suitable trigger.

In an embodiment, access nodes 514 and 516 may be neighboring access nodes such that the access nodes are communicatively coupled by communication link 520 (e.g., an X2 communication link). Accordingly, when performing a load balancing protocol, access nodes 514 and 516 may share load information (e.g., over communication link 520). The load information may comprise physical resource block utilization, processor utilization, data bearer channel utilization, and the like. Based on the shared load information, one or more wireless devices 502, 504, 506, 508, 510, and 512 may be handed over to access node 516. That is, the serving access node for one or more wireless devices 502, 504, 506, 508, 510, and 512 may change from access node 514 to access node 516.

In an embodiment, one or both of the neighbor relations protocol and the load balancing protocol may be performed in communication system 500. For example, access node 514 may perform one or both of the protocols. Accordingly, a conflict resolution system may be leveraged in order to manage the two protocols.

Figure 6:
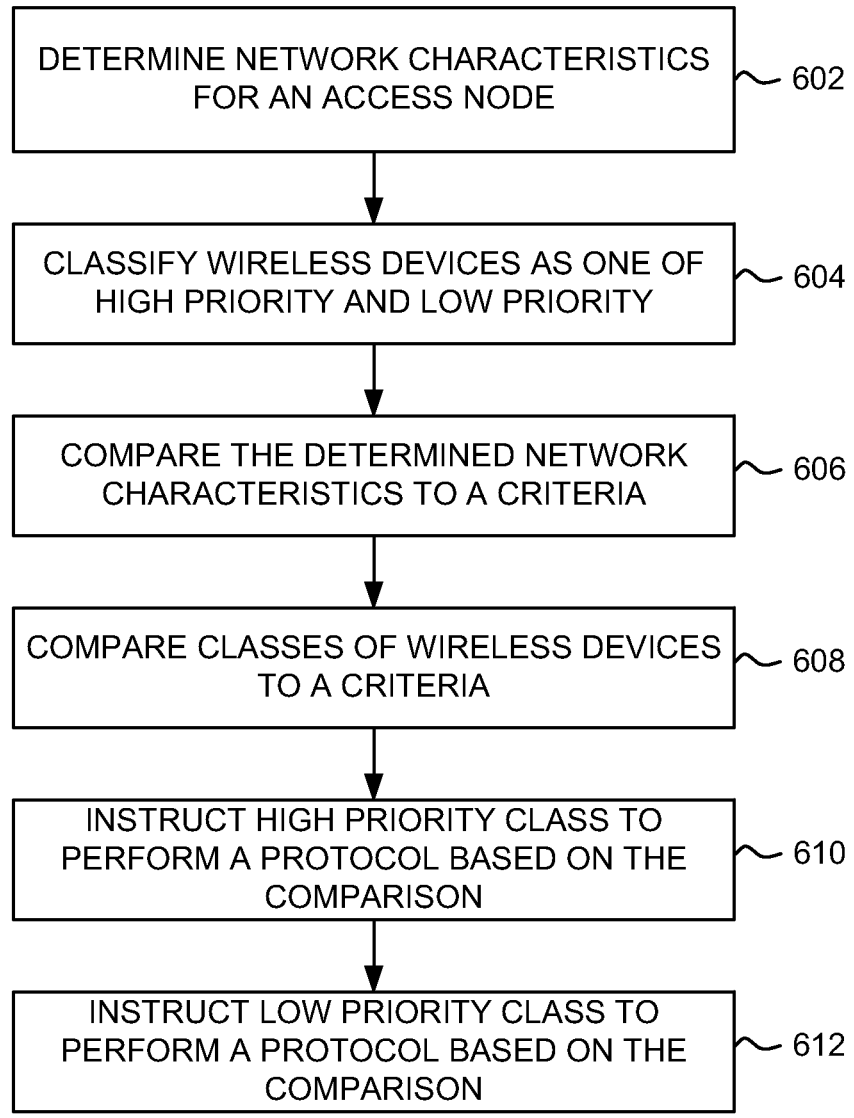
FIG. 6 illustrates another exemplary method of managing conflicts between a load balancing protocol and a neighbor relations protocol.

FIG. 6 illustrates an exemplary method for managing conflicts between a load balancing protocol and a neighbor relations protocol. The method will be discussed with reference to the exemplary communication system 500 illustrated in FIG. 5, however, the method can be implemented with any suitable communication system.

Referring to FIG. 6, at step 602, network characteristics for an access node may be determined. For example, network characteristics for access node 514 may be determined. The network characteristics may comprise a utilization indicator, a connectivity indicator, and a capacity indicator for access node 514. An example of a utilization indicator may be the physical resource block utilization of access node 514. An example of a connectivity indicator may be the number of Radio Resource Control (RRC) connections between access node 514 and wireless devices in communication with access node 514 (e.g., wireless devices 502, 504, 506, 508, 510, and 512). An example of a capacity indicator may be the utilization of the Physical Downlink Shared Channel (PDSCH) of access node 514. In another example, a capacity indicator may also be the utilization of data bearer channels of access node 514.

At step 604, wireless devices in communication with the access node are classified. For example, wireless devices 502, 504, 506, 508, 510, and 512 may be classified as one of a high priority and a low priority. Each wireless device may comprise a traffic condition and the wireless devices may be classified based on the traffic condition. The traffic condition may comprise an application requirement, a mobility, an activity factor, and any other suitable traffic condition. An application requirement, or a quality of service (QoS) requirement, may be one or more service conditions that a wireless device requests from an access node, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement.

In an embodiment, wireless devices 502, 506, and 510 may comprise a non-guaranteed data rate (e.g., non-GBR bit rate) as an application requirement and wireless devices 504, 508, and 512 may comprise a guaranteed data rate (e.g., GBR bit rate) as an application requirement. In this example, based on the application requirements, wireless devices 502, 506, and 510 may be classified as low priority and wireless devices 504, 508, and 512 may be classified as high priority.

At step 606, the determined network characteristics may be compared to a criteria. For example, the network characteristics determined for access node 514 (e.g., at step 602) may be compared to a criteria. The network characteristics may comprise a utilization indicator, a connectivity indicator, and a capacity indicator, and these indicators may be compared to the criteria.

At step 608, the classes of wireless devices may be compared to a criteria. For example, a number of high priority wireless devices and a number of low priority wireless devices may also be compared to the criteria. Accordingly, one or more of the utilization indicator, the connectivity indicator, the capacity indicator, the number of high priority wireless devices, and the number of low priority wireless devices may be compared to the criteria.

At step 610, the high priority class of wireless devices is instructed to perform one of a load balancing protocol and a neighbor relations protocol based on the comparison. For example, wireless device 504, 508, and 512 may be instructed to perform one of the load balancing protocol and the neighbor relations protocol based on the comparison from steps 606 and 608. The load balancing protocol may be a protocol used to balance load within communication system 500, as described herein. The neighbor relations protocol may be the Automatic Neighbor Relations protocol (ANR) as described herein.

At step 612, the low priority class of wireless devices is instructed to perform one of a load balancing protocol and a neighbor relations protocol based on the comparison. For example, wireless device 502, 506, and 510 may be instructed to perform one of the load balancing protocol and the neighbor relations protocol based on the comparison from step 606 and 608. The load balancing protocol may be a protocol used to balance load within communication system 500, as described herein. The neighbor relations protocol may be the Automatic Neighbor Relations protocol (ANR) as described herein.

In an embodiment, the high priority class of wireless devices and the low priority class of wireless devices may be instructed to perform the neighbor relations protocol. For example, where the determined utilization indicator is below a threshold, the determined connectivity indicator is above a threshold, and the determined capacity indicator is below a threshold, both the high priority class and the low priority class of wireless devices may be instructed to perform the neighbor relations protocol. In another example, where the determined utilization indicator is below a threshold, the determined connectivity indicator is below a threshold, and the determined capacity indicator is below a threshold, both the high priority class and the low priority class of wireless devices may be instructed to perform the neighbor relations protocol In an embodiment, the high priority class of wireless devices and the low priority class of wireless devices may be instructed to perform the load balancing protocol. For example, where the determined utilization indicator is above a threshold, the determined connectivity indicator is above a threshold, and the determined capacity indicator is above a threshold, both the high priority class and the low priority class of wireless devices may be instructed to perform the load balancing protocol.

In an embodiment, the high priority class of wireless devices may be instructed to perform the load balancing protocol and the low priority class of wireless devices may be instructed to perform the neighbor relations protocol. For example, where the determined utilization indicator is above a threshold, the determined connectivity indicator is below a threshold, the determined capacity indicator is above a threshold, and the number of high priority wireless devices is greater than the number of low priority wireless devices, the high priority class of wireless devices may be instructed to perform the load balancing protocol while the low priority class of wireless devices may be instructed to perform the neighbor relations protocol.

In an embodiment, the high priority class of wireless devices may be instructed to perform the neighbor relations protocol and the low priority class of wireless devices may be instructed to perform the load balancing protocol. For example, where the determined utilization indicator is above a threshold, the determined connectivity indicator is below a threshold, the determined capacity indicator is below a threshold, and the number of high priority wireless devices is less than the number of low priority wireless devices, the high priority class of wireless devices may be instructed to perform the neighbor relations protocol while the low priority class of wireless devices may be instructed to perform the load balancing protocol.

As referred to herein, the neighbor relations protocol may comprise an automatic neighbor relations (ANR) protocol. In an embodiment, wireless devices that are instructed to perform the ANR protocol may receive a signal criteria. For example, access node 514 may adjust a default ANR signal criteria lower such that the lowered ANR signal criteria would encourage a triggered reporting event at a wireless device. Access node 514 may transmit the signal criteria or the adjusted signal criteria to the wireless devices, for instance wireless device 512. A reporting event may be triggered at wireless device 512 based on a comparison of a signal level for a reference signal or pilot signal received from access node 514, a signal level for a reference signal or pilot signal received from access node 518, and the received signal criteria. Based on the triggered reporting event, wireless device 512 may transmit an identifier of access node 518 to access node 514. Access node 514 may determine that access node 518 does not comprise a known neighbor (e.g., does not comprise an entry in the neighbor relations table (NRT) of access node 514). Accordingly, access node 514 may request from wireless device 512 the global identifier of access node 518. After receiving the global identifier, a communication link between access node 514 and 518 may be established using the global identifier, and each access node may update their corresponding NRTs with an entry for their new neighbor access node. In an embodiment, a reporting event associated with ANR reporting may not be triggered at wireless devices that are not instructed to perform the neighbor relations protocol. For instance, a reporting event associated with ANR reporting may not be triggered at wireless devices instructed to perform the load balancing protocol. Accordingly, wireless devices that are not instructed to perform the neighbor relations protocol may not transmit a measurement report comprising the identifier of access node 518 to access node 514.

As referred to herein, the load balancing protocol may comprise a protocol to offload wireless devices from an access node. In an embodiment, access node 514 may be under operating conditions such that a load balancing protocol is triggered. For example, a utilization for access node 514 (e.g. physical resource block utilization, processor utilization, data bearer channel utilization, and the like) may be compared to a criteria, and load balancing protocol may be triggered based on the comparison. In another example, the load balancing protocol may be triggered based on a time period (e.g., periodic trigger), a threshold number of wireless devices in communication with access node 514, or any other suitable trigger. Access nodes 514 and 516 may be neighboring access nodes such that the access nodes are communicatively coupled by communication link 520 (e.g., an X2 communication link). Accordingly, when performing a load balancing protocol, access nodes 514 and 516 may share load information (e.g., over communication link 520). The load information may comprise physical resource block utilization, processor utilization, data bearer channel utilization, and the like. Based on the shared load information, one or more wireless devices instructed to perform the load balancing protocol may be handed over to access node 516. That is, the serving access node for one or more of the wireless devices that are instructed to perform the load balancing protocol may change from access node 514 to access node 516. In an embodiment, wireless devices that are not instructed to perform the load balancing protocol may not be handed over to access node 516 as a result of the load balancing protocol. For instance, wireless devices instructed to perform a neighbor relations protocol may not be handover over to access node 516 as a result of the load balancing protocol.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 7:
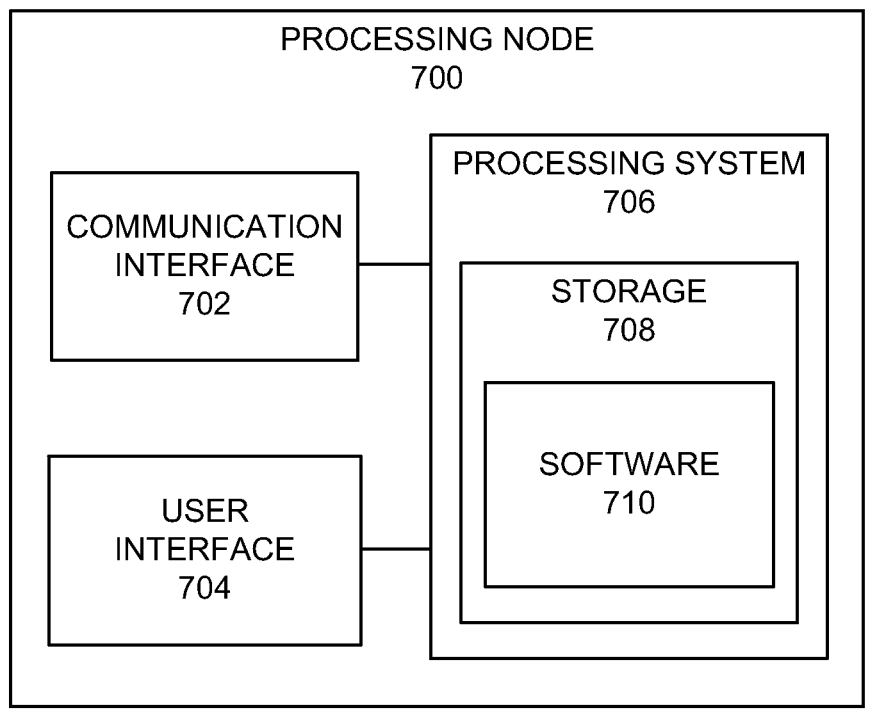
FIG. 7 illustrates an exemplary processing node.

FIG. 7 illustrates an exemplary processing node 700 in a communication system. Processing node 700 comprises communication interface 702, user interface 704, and processing system 706 in communication with communication interface 702 and user interface 704. Processing node 700 can be configured to determine a communication access node for a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include controller node 408 and gateway node 410. Processing node 700 can also be an adjunct or component of a network element, such as an element of access nodes 104, 106, 404, or 406. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of managing conflict between a load balancing protocol and an automatic neighbor relations protocol, the method comprising:
   triggering an automatic neighbor relations protocol and a load balancing protocol;
   determining network characteristics for an access node in communication with a plurality of wireless devices, wherein the network characteristics comprise a utilization indicator, a connectivity indicator, and a capacity indicator for the access node;
   classifying the plurality of wireless devices into one of a high priority class and a low priority class based on at least a quality of service requirement for each of the plurality of wireless devices; and
   instructing the high priority class to perform the load balancing protocol and the low priority class to perform the automatic neighbor relations protocol in response to the utilization indicator of the access node being at or above a threshold, the connectivity indicator of the access node being below a threshold, the capacity indicator of the access node being at or above a threshold, and a number of high priority class wireless devices is greater than a number of low priority class wireless devices, or
   instructing the high priority class to perform the automatic neighbor relations protocol and the low priority class to perform the load balancing protocol in response to the utilization indicator of the access node being at or above a threshold, the connectivity indicator of the access node being below a threshold, the capacity indicator of the access node being below a threshold, and a number of high priority class wireless devices being less than a number of low priority class wireless devices;
   wherein the automatic neighbor relations protocol comprises transmitting a measurement report comprising a neighboring access node identifier of a neighboring access node received at a wireless device of the plurality of wireless devices, and the access node updates a table storing information about neighboring access nodes by adding the neighboring access node identifier received from the wireless device.

2. The method of claim 1, further comprising:
   instructing the low priority class and the high priority class to perform the automatic neighbor relations protocol in response to meeting a criteria.

3. The method of claim 2,
   wherein the criteria is met when the utilization indicator of the access node is below a threshold, the connectivity indicator is above a threshold, and the capacity indicator is below a threshold.

4. The method of claim 1, further comprising:
   instructing the high priority class and the low priority class to perform the load balancing protocol when a criteria is met, the criteria being met when the utilization indicator of the access node is above a threshold, the connectivity indicator is above a threshold, and the capacity indicator is above a threshold.

5. The method of claim 1, wherein instructing the high priority class to perform the load balancing protocol comprises:
   receiving traffic data about traffic for a neighboring access node proximate to the access node; and
   instructing at least a portion of the high priority class of wireless devices to communicate with the neighboring access node.

6. The method of claim 1, wherein instructing the low priority class to perform the automatic neighbor relations protocol comprises:
   transmitting to the wireless device a signal criteria;
   receiving from the wireless device the access node identifier of a neighboring access node, wherein the identifier is transmitted from the wireless device in response to a comparison using the transmitted signal criteria; and establishing a communication link between the access node and the neighboring access node based on the received identifier.

7. A system of managing conflict between a load balancing protocol and an automatic neighbor relations protocol, the system comprising:
a controller comprising a processor, the controller configured to:
trigger an automatic neighbor relations protocol and a load balancing protocol;
determine network characteristics for an access node in communication with a plurality of wireless devices, wherein the network characteristics comprise a utilization indicator, a connectivity indicator, and a capacity indicator for the access node;
classify the plurality of wireless devices into one of a high priority class and a low priority class based on at least a quality of service requirement for each of the plurality of wireless devices; and
instruct the high priority class to perform the load balancing protocol and the low priority class to perform the automatic neighbor relations protocol in response to the utilization indicator of the access node being at or above a threshold, the connectivity indicator of the access node being below a threshold, the capacity indicator of the access node being at or above a threshold, and a number of high priority class wireless devices being greater than a number of low priority class wireless devices,
wherein the automatic neighbor relations protocol comprises transmitting a measurement report comprising a neighboring access node identifier of a neighboring access node received at a wireless device of the plurality of wireless devices, and the access node updates a table storing information about neighboring access nodes by adding the neighboring access node identifier received from the wireless device.

8. The system of claim 7, wherein the controller is further configured to:
instruct the low priority class and the high priority class to perform the automatic neighbor relations protocol in response to meeting a criteria.

9. The system of claim 8, wherein
the criteria is met when the utilization indicator of the access node is below a threshold, the connectivity indicator of the access node is above a threshold, and the capacity indicator is below a threshold.

10. The system of claim 7, wherein the controller is further configured to:
instruct the high priority class and the low priority class to perform the load balancing protocol when a criteria is met, the criteria being met when the utilization indicator of the access node is above a threshold, the connectivity indicator is above a threshold, and the capacity indicator is above a threshold.

11. The system of claim 7, wherein instructing the high priority class to perform the load balancing protocol comprises:
receiving traffic data about traffic for a neighboring access node proximate to the access node; and
instructing at least a portion of the high priority class of wireless devices to communicate with the neighboring access node.

12. The system of claim 7, wherein instructing the low priority class to perform the automatic neighbor relations protocol comprises:
transmitting to the wireless device a signal criteria;
receiving from the wireless device the access node identifier of a neighboring access node, wherein the identifier is transmitted from the wireless device in response to a comparison using the transmitted signal criteria; and
establishing a communication link between the access node and the neighboring access node based on the received identifier.

13. A system of managing conflict between a load balancing protocol and an automatic neighbor relations protocol, the system comprising:
a controller comprising a processor, the controller configured to:
trigger an automatic neighbor relations protocol and a load balancing protocol;
determine network characteristics for an access node in communication with a plurality of wireless devices, wherein the network characteristics comprise a utilization indicator, a connectivity indicator, and a capacity indicator for the access node;
classify the plurality of wireless devices into one of a high priority class and a low priority class based on at least a quality of service requirement for each of the plurality of wireless devices; and
instruct the high priority class to perform the automatic neighbor relations protocol and the low priority class to perform the load balancing protocol in response to the utilization indicator of the access node being at or above a threshold, the connectivity indicator of the access node being below a threshold, the capacity indicator of the access node being below a threshold, and a number of high priority wireless devices being less than a number of low priority wireless devices.

* * * * *